US009145947B2

(12) United States Patent
Amano et al.

(10) Patent No.: US 9,145,947 B2
(45) Date of Patent: Sep. 29, 2015

(54) TORSIONAL VIBRATION DAMPING DEVICE

(75) Inventors: Hiroyuki Amano, Susono (JP); Yu Miyahara, Susono (JP); Shingo Aijima, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/380,430

(22) PCT Filed: Feb. 26, 2012

(86) PCT No.: PCT/JP2012/054668
§ 371 (c)(1),
(2), (4) Date: Aug. 22, 2014

(87) PCT Pub. No.: WO2013/125050
PCT Pub. Date: Aug. 29, 2013

(65) Prior Publication Data
US 2015/0000999 A1    Jan. 1, 2015

(51) Int. Cl.
| F16F 15/00 | (2006.01) |
| F16F 15/129 | (2006.01) |
| F16H 45/02 | (2006.01) |
| F16F 15/14 | (2006.01) |

(52) U.S. Cl.
CPC ............. *F16F 15/129* (2013.01); *F16F 15/145* (2013.01); *F16H 45/02* (2013.01); *F16H 2045/0263* (2013.01)

(58) Field of Classification Search
CPC ........................................ G03B 21/42
USPC ................................. 181/209, 207
See application file for complete search history.

(56) References Cited

U.S. PATENT DOCUMENTS

| 2,383,516 | A   |   | 8/1945  | Salomon                  |
|-----------|-----|---|---------|--------------------------|
| 4,232,084 | A   | * | 11/1980 | Tate ............................ 428/321.5 |
| 4,355,578 | A   | * | 10/1982 | Raquet ........................... 104/306 |
| 5,087,021 | A   | * | 2/1992  | Tanahashi et al. ........ 267/140.12 |
| 5,734,133 | A   | * | 3/1998  | Mayer et al. .................. 181/208 |
| 6,749,397 | B2  | * | 6/2004  | Ueyama et al. .............. 415/119 |
| 7,837,008 | B1  | * | 11/2010 | Lane et al. .................... 181/284 |

(Continued)

FOREIGN PATENT DOCUMENTS

| DE | 767802 C | 8/1953 |
| DE | 102004004176 A1 | 8/2005 |

(Continued)

*Primary Examiner* — Forrest M Phillips
(74) *Attorney, Agent, or Firm* — Kenyon & Kenyon LLP

(57) ABSTRACT

A torsional vibration damping device in which a first rolling contact surface that is curved with a center of curvature at a location offset from a rotation center of a rotating body, which rotates upon receiving a torque, is formed along a circumferential direction of the rotating body at a location offset from the rotation center of the rotating body in a radial direction, and which includes the rolling element that is brought into contact with the first rolling contact surface by receiving a centrifugal force resulting from rotation with the rotating body and that rolls along the first rolling contact surface through torsional vibrations of the rotating body is described. The rolling element includes a first rolling element that rolls along the first rolling contact surface and that is formed in a hollow shape, and a second rolling element that is arranged inside the first rolling element such that the second rolling element rolls along a second rolling contact surface formed inside the first rolling element.

10 Claims, 7 Drawing Sheets

(56) References Cited

U.S. PATENT DOCUMENTS

2005/0155449 A1* 7/2005 Birchmeier et al. ............ 74/552
2010/0242466 A1   9/2010 Krause et al.

FOREIGN PATENT DOCUMENTS

| | | |
|---|---|---|
| JP | 2002-340097 A | 11/2002 |
| JP | 2011-504987 A | 2/2011 |

* cited by examiner

TORSIONAL VIBRATION DAMPING DEVICE

CROSS-REFERENCE TO RELATED APPLICATIONS

This is a national phase application based on the PCT International Patent Application No. PCT/JP2012/054668 filed Feb. 26, 2012, the entire contents of which are incorporated herein by reference.

TECHNICAL FIELD

This invention relates to a device for reducing torsional vibrations of a rotating body such as a crankshaft, a power transmission shaft or the like. In particular, this invention relates to a device that reduces torsional vibrations of a rotating body through the use of relative pendular movements of a rolling inertia mass body.

BACKGROUND ART

A rotating body such as a shaft that transmits a torque or the like may vibrate due to fluctuations in an input torque itself, fluctuations in a load torque resulting from a load member that is coupled to the rotating body, a slight deviation of the center of gravity of a rotary system, or the like. Such torque fluctuations act on the rotating body as torsional vibrations. Various devices for reducing the torsional vibrations have been conventionally developed. One such example is a device that is referred to as a so-called dynamic damper. The dynamic damper is configured to form another vibration system other than the rotating body by an inertia mass body that is separately provided, and to reduce vibrations with a frequency equivalent to a resonant frequency of the vibration system caused by the inertia mass body, due to the fact that the resonant frequency of the vibration system by the inertia mass body is different from the resonant frequency of the rotating body.

In this kind of device, the inertia mass body vibrates relatively to the rotating body, and hence friction occurs at contact locations therebetween. If the frictional force or the friction resistance is large, abrasion progresses to cause a fall in durability. Besides, the frictional force acts in such a manner as to suppress vibrations of the inertia mass body. Therefore, if the frictional force changes, the frequency characteristic changes, and it may become impossible to reduce the target vibrations. Besides, on the other hand, the torsional vibrations that are transmitted from an internal combustion engine differ depending on the rotational speed. Therefore, a vibration damping device that has a natural frequency adapted for the rotational speed may be employed for the internal combustion engine. Such a so-called rotational speed adaptation-type vibration damping device is configured, as an example, to change the pendulum radius of the inertia mass body that makes pendular movements.

A device that is configured to reduce friction between the inertia mass body and the rotating body as the former is described in Japanese Patent Application Publication No. 2002-340097 (JP-2002-340097 A). In the device described in this Japanese Patent Application Publication No. 2002-340097 (JP-2002-340097 A), a rigid body pendulum is rotatably attached, by a spindle, to an outer peripheral side that is offset from a rotation center of a pulley body that is integrated with a drive shaft. Abrasion reduction means such as a fluorocarbon resin coat or the like is provided between an outer peripheral surface of the spindle and an inner peripheral surface of a hole that is penetrated by the spindle. Besides, a rotational speed adaptation-type vibration damping device as the latter is described in Published Japanese Translation of PCT Application No. 2011-504987 (JP-2011-504987 A).

The aforementioned device described in Japanese Patent Application Publication No. 2002-340097 (JP-2002-340097 A) can reduce friction between an inertia mass body and a rotating body to suppress abrasion and enhance durability. However, since the pendulum radius of the inertia mass body is constant, the natural frequency changes depending on the rotational speed. In the case where the frequency of vibrations to be damped changes as a result, it may not be possible to obtain desired vibration damping characteristics. Accordingly, in the case where the rotational speed of the rotating body as a subject of vibration damping changes and the order of vibrations to be damped changes as a result, a device structured to change the substantial pendulum radius as described in Published Japanese Translation of PCT Application No. 2011-504987 (JP-2011-504987 A) is employed. In that case, as described in Published Japanese Translation of PCT Application No. 2011-504987 (JP-2011-504987 A), a rolling contact surface whose curvature is constant or changes is formed on at least one of the rotating body and the inertia mass body, and the inertia mass body or a shaft member that removably supports this inertia mass body is supported by the rolling contact surface and rolled along the rolling contact surface. That is, the rolling contact surface serves as a contact location between the inertia mass body and the rotating body.

In the vibration damping device that is configured to roll the inertia mass body, desired vibration damping performance is exerted through smooth rolling of the inertia mass body (i.e., a rolling element). However, the rolling contact surface is a curved surface that has a center of curvature at a location spaced apart from the rotation center of the rotating body. Therefore, in a state where the rolling element moves to a position that is offset from a line that links the center of the rotating body with the center of curvature of the rolling contact surface, the load in the direction of a normal line, which presses the rolling element against the rolling contact surface as a result of a centrifugal force, is small, and a large force is applied in a tangential direction. Accordingly, if a treatment of reducing friction as described in Japanese Patent Application Publication No. 2002-340097 (JP-2002-340097 A) is applied to the rolling contact surface or a predetermined outer surface of the rolling element that is in contact therewith, the rolling element slips with respect to the rolling contact surface without rolling thereon. As a result, desired vibration damping performance may not be obtained.

SUMMARY OF THE INVENTION

This invention has been made in view of the aforementioned technical problems. It is an object of this invention to provide a torsional vibration damping device that smoothly rolls a mass body along a rolling contact surface that is formed on a rolling body without causing slippage and thus exerts excellent vibration damping performance.

In order to solve the aforementioned problems, this invention provides a torsional vibration damping device in which a first rolling contact surface that is curved with a center of curvature at a location offset from a rotation center of a rotating body, which rotates upon receiving a torque, is formed along a circumferential direction of the rotating body at a location offset from the rotation center of the rotating body in a radial direction, and which includes a rolling element that is brought into contact with the first rolling contact surface by receiving a centrifugal force resulting from rotation with the rotating body and that rolls along the first rolling contact surface through torsional vibrations of the rotating body. The torsional vibration damping device is characterized in that the rolling element includes a first rolling element that rolls along the first rolling contact surface and that is formed in a hollow shape, and a second rolling element that is arranged inside the first rolling element such that the second rolling element rolls along a second rolling contact surface formed inside the first rolling element.

The rolling element may be configured to be immersed in oil and roll in the oil. For example, it is possible to adopt a configuration in which the rotating body and the rolling element are accommodated inside a casing of a fluid coupling whose interior is filled with oil.

In this invention, the first rolling element may be formed in a cylindrical shape, and the second rolling element may be formed in a shape of a solid circular column with an outer diameter that is smaller than an inner diameter of the first rolling element. In that case, a guide portion that restrains the first rolling element and the second rolling element from relatively deviating from each other in an axial direction can be provided on at least one of an inner peripheral portion of the first rolling element and an outer peripheral portion of the second rolling element.

For example, the first rolling element and the second rolling element may be formed such that an axial length of the second rolling element becomes longer than an axial length of the first rolling element, and the guide portion may be constituted by flange portions that are formed at both ends of the second rolling element in the axial direction and that protrude outward in the radial direction so as to sandwich the first rolling element.

Alternatively, the first rolling element and the second rolling element may be formed such that an axial length of the first rolling element becomes longer than an axial length of the second rolling element, and the guide portion may be constituted by a groove portion that is formed at a central portion of an inner peripheral surface of the first rolling element in the axial direction such that the second rolling element is rollably fitted therein.

On the other hand, a hollow portion that is formed inside the first rolling element may be closed by a cover member such that the second rolling element, which is arranged inside the hollow portion, does not fall out.

In that case, the cover member may seal the hollow portion in a liquid-tight state, and the hollow portion may be filled with oil.

Besides, in this invention, the rolling element can assume a so-called multiple structure such as a three- or more-fold structure. For example, the second rolling element may be formed in a hollow shape and rolls along the second rolling contact surface, a third rolling contact surface may be formed on an inner peripheral surface of the second rolling element, and a third rolling element that rolls along the third rolling contact surface may accommodated inside the second rolling element.

According to this invention, the rolling element is pressed against the first rolling contact surface due to a centrifugal force resulting from rotation of the rotating body. If the rotating body is subjected to torsional vibrations in that state, the rolling element makes pendular movements around the first rolling contact surface. As a result, the torsional vibrations of the rotating body are damped or reduced. The rolling element in this invention has the first rolling element that is formed in a hollow shape and rolls along the first rolling contact surface, and the second rolling element that is accommodated inside the first rolling element and rolls along rolls along the second rolling contact surface formed inside the hollow portion of the first rolling element. Therefore, even though the first rolling element has the hollow shape, the rolling element has a resultant mass consisting of the mass of the first rolling element and the mass of the second rolling element, and hence can be ensured of a required and sufficient mass. Besides, upon receiving a load in such a manner as to move relatively in the circumferential direction of the rotating body, the second rolling element operates not only to roll along the second rolling contact surface per se but also to roll the first rolling element along the first rolling contact surface. The operation can be described as follows. That is, the second rolling element rotates together with the rotating body, and hence receives a centrifugal force. Therefore, if the center of gravity of the second rolling element is offset from a normal line that passes through a contact point between the first rolling element and the first rolling contact surface, a moment that rotates the first rolling element is applied thereto. As a result, the rolling of the first rolling element is promoted not only by the inertial force of the first rolling element but also by a moment resulting from the movement of the second rolling element. Thus, according to this invention, the rolling element can be prevented or restrained from slipping, and can be smoothly rolled. Therefore, desired vibration damping performance can be obtained. Besides, even if there are a plurality of contact locations, those contacts are rolling contacts. Therefore, abrasion is suppressed, and durability is enhanced.

Besides, if the rolling element that is constituted of the first rolling element and the second rolling element in this invention is configured to be immersed in oil and roll in the oil, the first rolling element and the second rolling element may collide with each other, but an impact of the collision can be mitigated by the oil, and the propagation of an impact noise is mitigated. Thus, such a structure makes it possible to prevent or restrain abnormal noise or noise from being generated.

Furthermore, in this invention, due to the provision of the guide portion or the cover member, the relative positions of the first rolling element and the second rolling element can be maintained as desired. Furthermore, if the third rolling element is further provided inside the second rolling element, the rolling element as a whole can more smoothly roll, and can be restrained from slipping.

MODES FOR CARRYING OUT THE INVENTION

Figure 1:
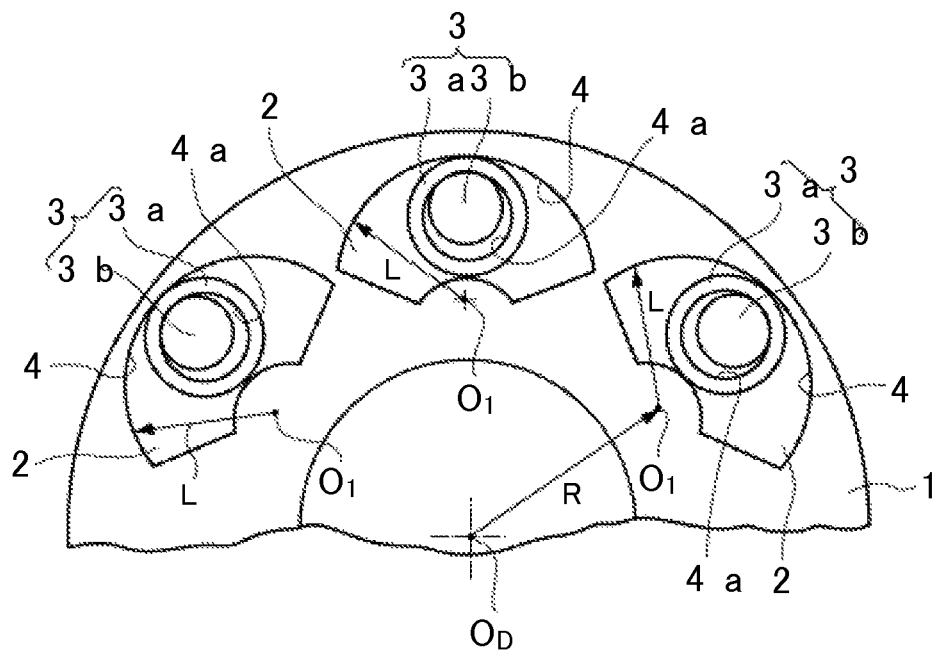
FIG. 1 is a partial front view for illustrating an example of a torsional vibration damping device according to this invention.
Figure 2:
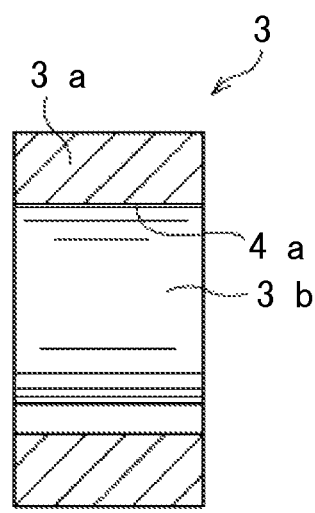
FIG. 2 is an enlarged cross-sectional view of each rolling element shown in FIG. 1.

Next, this invention will be described more concretely. A torsional vibration damping device according to this invention is a so-called dynamic damper, and is configured to reduce or damp torsional vibrations of a rotating body that is subjected to torsional vibrations by causing an inertia mass body to make pendular movements with respect to the rotating body that makes pendular movements. In particular, the torsional vibration damping device according to this invention is configured to roll the inertia mass body along a rolling contact surface that is formed on the rotating body. Accordingly, in a concrete example that will be described hereinafter, the inertia mass body will be referred to as a rolling element. FIG. 1 schematically shows an example of this invention. A rotating body 1 is a circular plate-like member as an example, and is configured to rotate integrally with a rotary shaft such as a crankshaft of an engine (not shown), a rotary shaft of a transmission (not shown), or the like. A plurality of accommodation chambers 2 are formed at certain intervals in a circumferential direction in an outer peripheral region of this rotating body 1. As shown in FIG. 2, these accommodation chambers 2 are hollow regions that are formed in such a manner as to penetrate or perforate the rotating body 1. The accommodation chambers 2 are designed to accommodate later-described rolling elements 3, define and secure rolling ranges thereof, and further form rolling contact surfaces 4 respectively.

In the example shown in FIG. 1, each of the accommodation chambers 2 is formed in a curved fan-like shape, and an inner wall surface on an outer peripheral side of each of the accommodation chambers 2 serves as a corresponding one of the rolling contact surfaces 4. A center $O_1$ of curvature of the rolling contact surface 4 is located at a predetermined location that is offset outward from a rotation center $O_0$ of the rotating body 1 in a radial direction. Besides, the rolling contact surface 4 is not absolutely required to be a complete circular arc surface, but may be a curved surface such as a cycloid surface whose center of curvature (or whose instantaneous center) continuously changes. Each center of curvature (or each instantaneous center) of each of such curved surfaces is also located at a predetermined position that is offset outward from a rotation center $O_0$ of the rotating body 1 in the radial direction.

In the example shown in FIG. 1, the rolling element 3 that is rollably accommodated in each of the accommodation chambers 2 is constituted of a first rolling element 3a that rolls along the rolling contact surface 4 and has a hollow shape, and a second rolling element 3b that is arranged inside the first rolling element 3a. The first rolling element 3a is formed in a cylindrical shape (or in the shape of a hollow shaft with a short axial length). The axial length (or the width) of the first rolling element 3a is equal to the depth of the accommodation chamber 2 (or about the thickness of the rotating body 1). An inner peripheral surface of the first rolling element 3a (an inner peripheral wall that forms a hollow portion) is a circumferential surface that is concentric with an outer peripheral surface of the first rolling element 3a, and serves as the rolling contact surface 4a into which the second rolling element 3b accommodated in the hollow portion comes into contact to roll. Incidentally, this rolling contact surface 4a is equivalent to the second rolling contact surface in this invention, and the rolling contact surface 4 that forms the accommodation chamber 2 is equivalent to the first rolling contact surface in this invention. Then, there is adopted a configuration in which the outer diameter of the second rolling element 3b is slightly smaller than the inner diameter of the aforementioned hollow portion in the first rolling element 3a, and hence the second rolling element 3b can roll along the second rolling contact surface 4a. Besides, the outer diameter of the first rolling element 3a is set approximately equal to or slightly smaller than the opening width of the accommodation chamber 2. This is intended to restrain, to a maximum possible extent, the first rolling element 3a from making movements other than rolling in the accommodation chamber 2.

Next, the operation of the torsional vibration damping device configured as shown in FIG. 1 and FIG. 2 will be described. Due to rotation of the rotating body 1, the rolling element 3, which is arranged in the accommodation chamber 2 thereof, rotates (moves in orbit) together with the rotating body 1, and hence the rolling element 3 is pressed against the rolling contact surface 4 due to a centrifugal force. On the other hand, the foregoing rolling contact surface 4 that is located on the inner peripheral surface, which forms the accommodation chamber 2, on the outer peripheral side of the rotating body 1 is a curved surface whose radius of curvature is smaller than the radius of the rotating body 1. Therefore, a central portion of the rolling contact surface 4, namely, a position at which a line that links a center $O_0$ of the rotating body 1 with a center $O_1$ of curvature of the rolling contact surface 4 intersects with the rolling contact surface 4 is most distant from the center $O_0$ of the rotating body 1. Accordingly, in a state where a centrifugal force is applied to the rolling element 3 and no force is applied in the circumferential direction of the rotating body 1, the rolling element 3 is moved to the position of the rolling contact surface 4 that is most distant from the center $O_0$ of the rotating body 1. FIG. 1 shows that state. In the following description, this position may be referred to as a neutral position. At this neutral position, a center of the first rolling element 3a and a center of the second rolling element 3b are located on the foregoing line that links the center $O_0$ of the rotating body 1 with the center $O_1$ of curvature of the rolling contact surface 4. Besides, since the radius of an outer peripheral surface of the first rolling element 3a is smaller than the radius of curvature of the rolling contact surface 4, the first rolling element 3a is in line contact with the rolling contact surface 4. Besides, since the radius of an outer peripheral surface of the second rolling element 3b is smaller than the radius of curvature of the so-called second rolling contact surface 4a that is formed inside the first rolling element 3a, the second rolling element 3b is in line contact with the second rolling contact surface 4a.

If the torque applied to the rotating body 1 fluctuates in this state, an acceleration is generated in the rotating body 1 in the circumferential direction thereof. In contrast, an inertial force is applied to the rolling elements 3 in the opposite direction of the acceleration, and each of the rolling elements 3 rolls (revolves around its own axis) along a corresponding one of the rolling contact surfaces 4. Then, if the acceleration results from torsional vibrations, the rolling element 3 vibrates while making reciprocating movements, namely, pendular movements along the rolling contact surface 4. A distance from a fulcrum of the pendular movements, namely, the center $O_1$ of curvature of the rolling contact surface 4 to a center of gravity of the rolling element 3 is a length L of an arm of the pendular movements. Given that R denotes a distance between the center $O_1$ of curvature and the rotation center $O_0$ of the rotating body 1, a reciprocating movement order of the rolling element 3 is expressed as:

$$n=(R/L)^{1/2}.$$

This is made to coincide with a rotational fluctuation order (an order of torsional vibrations) of the rotating body 1, so that torsional vibrations of the rotating body 1 are damped or reduced.

In the aforementioned concrete example, pendular movements of the rolling element 3 that causes such a vibration damping effect occur when the first rolling element 3a rolls along the rolling contact surface 4 that forms the accommodation chamber 2, and the second rolling element 3b rolls along the so-called second rolling contact surface 4a as an inner surface of the first rolling element 3a. Then, the rolling element 3 assumes such a so-called double structure, so that the rolling element 3 smoothly rolls without causing excessive slippage with respect to the rolling contact surface 4.

The reasons why or the principles according to which the rolling element is likely to roll in the case where the rolling element assumes a multiple structure as described above are not immediately apparent, but can be inferred as follows. One of the reasons is that the second rolling element 3b that is provided inside is considered to generate a moment that rolls the first rolling element 3a on the outer side. That is, a line of action of a load (a load resulting from the foregoing centrifugal force and the foregoing inertial force) in a direction in which the second rolling element 3b is pressed against the so-called second rolling contact surface 4b does not coincide with a normal line that passes through a point at which the first rolling element 3a is in contact with the rolling contact surface 4, and the line of action of the load may be offset forward in a rolling direction. Thus, the load generates a moment that rolls the first rolling element 3a along the rolling contact surface 4.

Besides, another reason is considered to consist in that the rolling distance of the second rolling element 3b on the inner side is short, that the amount by which the second rolling element 3b on the inner side rotates around its own axis is small, and that the force needed for the rolling element 3 to roll as a whole is therefore small. The third reason is considered to consist in that the diameter of the second rolling element 3b on the inner side is small, that the force needed for the second rolling element 3b on the inner side to rotate around its own axis is therefore small, and that the second rolling element 3b is likely to roll as a result. The first rolling element 3a on the outer side, which rollably retains the second rolling element 3b inside, is likely to roll, and the rolling element 3 is likely to roll as a whole.

Figure 3:
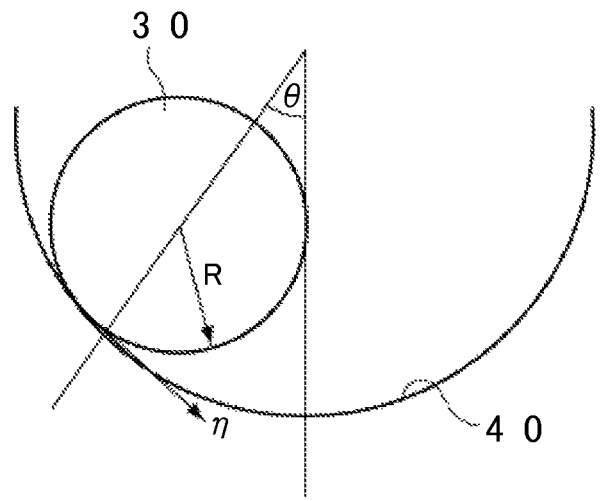
FIG. 3 is a view for illustrating a rolling frictional force in a case where a rolling element of a solid structure is rolled along a circular arc-like rolling contact surface in a gravitational field.

It should be noted herein that a rolling frictional force (a rolling resistance) will be reviewed. FIG. 3 shows a state where the rolling element 30, which is in the shape of a solid circular column, is arranged on the circular arc-like rolling contact surface 40 in a gravitational field. A resistance force (a rolling frictional force) $\eta$ in the case where the rolling element 30 rolls due to a gravitational force is expressed as:

$$\eta=\{\lambda/(1+\lambda)\}\cdot mg\theta.$$

Incidentally, $\lambda$ denotes a coefficient that is determined by the shape of the rolling element (a pendulum), m denotes a mass of the rolling element 30, g denotes a gravitational acceleration, and $\theta$ denotes a pendulant angle from the neutral position where the rolling element 30 is located at a lowest portion. Besides, an autorotation inertia I of the rolling element 30 shaped as shown in FIG. 3 is expressed as:

$$I=\lambda mR^2.$$

R denotes a radius of the rolling element 30.

Figure 4:
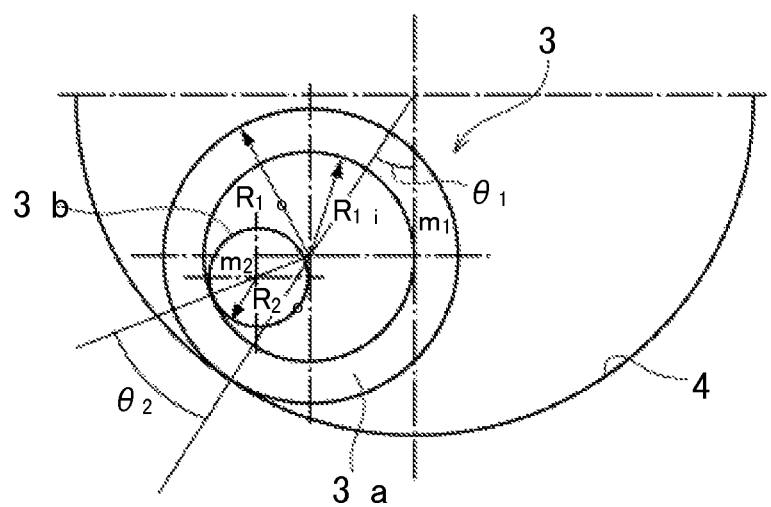
FIG. 4 is a view for illustrating a rolling frictional force in a case where a rolling element of a so-called double structure in the torsional vibration damping device according to this invention is rolled along a circular arc-like rolling contact surface in a gravitational field.

Rolling frictional forces $\eta_1$ and $\eta_2$ in the case where the rolling element assumes a so-called multiple structure as shown in FIG. 1 and FIG. 2 are obtained on the basis of this concept, as follows. FIG. 4 shows a state where the second rolling element 3b in the shape of a solid circular column is rollably arranged inside the cylindrical first rolling element 3a to constitute the rolling element 3, this rolling element 3 is arranged on the circular arc-like rolling contact surface 4 in a gravitational field, and the rolling element 3 has swung from the neutral position by a predetermined angle $\theta 1$. As illustrated in this FIG. 4 as well, a ratio (an inner/outer diameter ratio) $\gamma$ between an outer diameter R1o and an inner diameter R1i of the first rolling element 3a is expressed as:

$$\gamma=R1i/R1o.$$

Given that m1 denotes a mass of the first rolling element 3a, and that m2 denotes a mass of the second rolling element 3b, a mass m of the rolling element 3 as a whole is expressed as:

$$m=m1+m2.$$

Accordingly, the rolling frictional force $\eta_1$ of the first rolling element 3a on the outer side is expressed as follows.

$$\eta_1 = \frac{-1(1-\gamma)m_1 m_2 \theta_2 - \frac{(1-\gamma)m_2\{(m_1+m_2)\theta_1 - m_2\theta_2\}}{(1+\lambda)m_1} + (m_1+m_2)\theta_1}{(1+\lambda) + \frac{(1-\gamma^2)\lambda m_2}{(1+\lambda)m_1}} \lambda g \quad \text{[Expression 1]}$$

Incidentally, $\theta 2$ denotes a pendulant angle of the second rolling element 3b with respect to the first rolling element 3a.

The denominator of this expression assumes a value larger than the denominator $(1+\lambda)$ in the expression of the rolling frictional force $\eta$ in the case where the aforementioned solid body is used as the rolling element. Besides, the first term of the numerator assumes a negative value. Furthermore, the second term of the numerator assumes the same value as the numerator in the expression of the rolling frictional force $\eta$ in the case where the aforementioned solid body is used as the rolling element. Then, after all, as shown in FIG. 4, the rolling frictional force $\eta_1$ about the first rolling element 3a on the outer side of the rolling element 3 of a so-called double structure is smaller than the rolling frictional force $\eta$ in the case where a solid body having the same outer diameter as the first rolling element 3a is used as the rolling element. That is, the first rolling element 3a is likely to roll.

Besides, the rolling frictional force $\eta_2$ about the second rolling element 3b on the inner side is as follows.

$$\eta_2 = \frac{\frac{-1(1-\gamma)\{(m_1+m_2)\theta_1 - m_2\theta_2\}}{(1+\lambda)m_1} + \theta_2}{(1+\lambda) + \frac{(1-\gamma^2)\lambda m_2}{(1+\lambda)m_1}} \lambda m_2 g \quad \text{[Expression 2]}$$

In this expression as well, the denominator assumes a value larger than the denominator $(1+\lambda)$ in the expression of the rolling frictional force $\eta$ in the case where the aforementioned solid body is used as a rolling element. Besides, the first term of the numerator assumes a negative value. Furthermore, the second term of the numerator assumes a value smaller than the numerator $(\lambda mg\theta)$ in the expression of the rolling frictional force $\eta$ in the case where the aforementioned solid body is used as a rolling element. Then, after all, as shown in FIG. 4, the rolling frictional force $\eta_2$ about the second rolling element 3b on the inner side in the rolling element 3 of a so-called double structure is smaller than the rolling frictional force $\eta$ in the case where the solid body having the same outer diameter as the first rolling element 3a on the outer side is used as a rolling element. That is, the second rolling element 3b is likely to roll.

As described above in conjunction with inference and simple analysis, in the torsional vibration damping device according to this invention, the rolling element 3 smoothly rolls along the rolling contact surface 4 without slipping. Therefore, owing to a small amount of slippage as a disturbance factor, the vibration order can be prevented or restrained from straying from a desired order, and the vibration damping performance can be prevented or restrained from deteriorating as a result.

In particular, in the torsional vibration damping device as a subject of this invention, if the rolling element is offset from the foregoing so-called neutral position, the direction of the normal line that passes through the point at which the rolling element is in contact with the rolling contact surface does not coincide with the direction of a centrifugal force at that point (i.e., the direction of a line that links that point with the rotation center of the rotating body), and the force with which the rolling element is pressed against the rolling contact surface becomes small. The degree of the decrease in the force increases in accordance with the distance by which the rolling element is spaced apart from the foregoing neutral position. That is, the frictional force that is applied between the rolling element and the rolling contact surface becomes small, so that the rolling element is likely to slip. In contrast, in the aforementioned torsional vibration damping device according to this invention, the rolling element 3 assumes the aforementioned multiple structure and is configured to be likely to roll. Therefore, the rolling element is unlikely to slip even when greatly offset from the neutral position, and the vibration damping performance is held good. In consideration of this point, in the torsional vibration damping device according to this invention, there is no need to provide, between the rolling element 3 and the rolling contact surface 4, means for increasing the slipping frictional force therebetween. Therefore, the configuration of the device as a whole can be simplified, and the durability can be enhanced. For example, in the case where a high-friction material for suppressing slippage, such as rubber or the like, is provided, the configuration is complicated correspondingly, and moreover, the wear of the high-friction material progresses as a result of repeated application of a large compression load with extremely high frequency, so that there is a high possibility of a drop in durability. However, such an inconvenience is not caused in this invention. Besides, if, for example, a gear or a meshing mechanism similar thereto is provided between the rolling element and the rolling contact surface, the vibration damping performance may deteriorate due to slippage on tooth flanks thereof, or an inconvenience such as a drop in durability or the like may be caused as a result of abrasion or the like of the tooth flanks. However, such an inconvenience is not caused in this invention.

Figure 5:
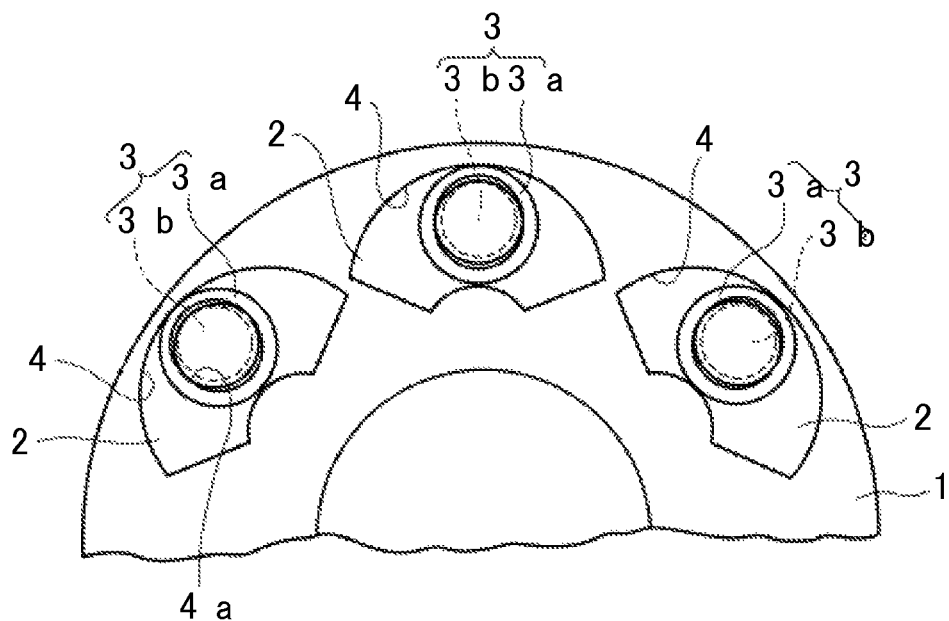
FIG. 5 is a partial front view for illustrating another example of the torsional vibration damping device according to this invention.
Figure 6:
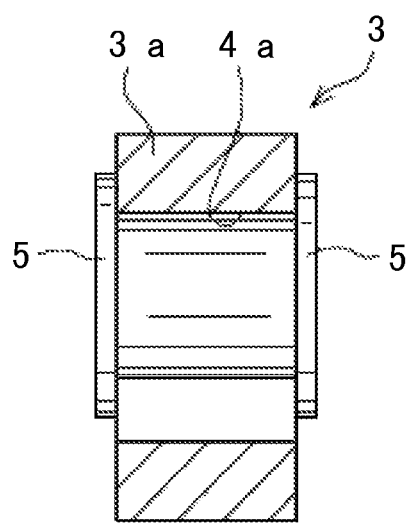
FIG. 6 is an enlarged cross-sectional view of each rolling element shown in FIG. 5.

In the torsional vibration damping device according to this invention, the second rolling element 3b that rolls with respect to the first rolling element 3a is provided inside the first rolling element 3a that rolls along the rolling contact surface 4 that is formed on the rotating body 1, or a third rolling element is further provided inside the second rolling element 3b. In this manner, it is appropriate that the rolling element assume a so-called multiple structure. However, it is conceivable that a force in an axial direction of each of these rolling elements 3a and 3b be applied thereto. Therefore, it is preferable to restrain the respective rolling elements from moving or deviating relatively in the axial direction due to the force in the axial direction. FIG. 5 and FIG. 6 show an example configured to restrain such a relative movement or deviation in the axial direction. Each of the second rolling elements 3b on the inner side is configured such that the axial length thereof becomes longer than the axial length (or the width) of a corresponding one of the first rolling elements 3a (more precisely, the hollow portion formed in a corresponding one of the first rolling elements 3a). Flange portions 5 that are engaged with both lateral surfaces of the first rolling element 3a to restrain the first rolling element 3a from moving relatively in the axial direction are formed at both ends of this second rolling element 3b respectively. In other words, a groove in which an inner peripheral portion of the first rolling element 3a is loosely fitted is formed in an outer peripheral portion of the second rolling element 3b. Accordingly, in the rolling element 3 that is configured as shown in FIG. 5 and FIG. 6, in a state where the second rolling element 3b rolls in contact with the so-called second rolling contact surface 4a as the inner peripheral surface of the first rolling element 3a, the flange portions 5 that are formed at both the ends of the second rolling element 3b in the axial direction respectively are hooked on the lateral surfaces of the first rolling element 3a respectively. It is therefore possible to prevent the first rolling element 3a and the second rolling element 3b from relatively deviating from each other in the axial direction. Incidentally, the aforementioned flange portions 5 or the groove portion between those flange portions 5 are equivalent to the guide portion in this invention.

Figure 7:
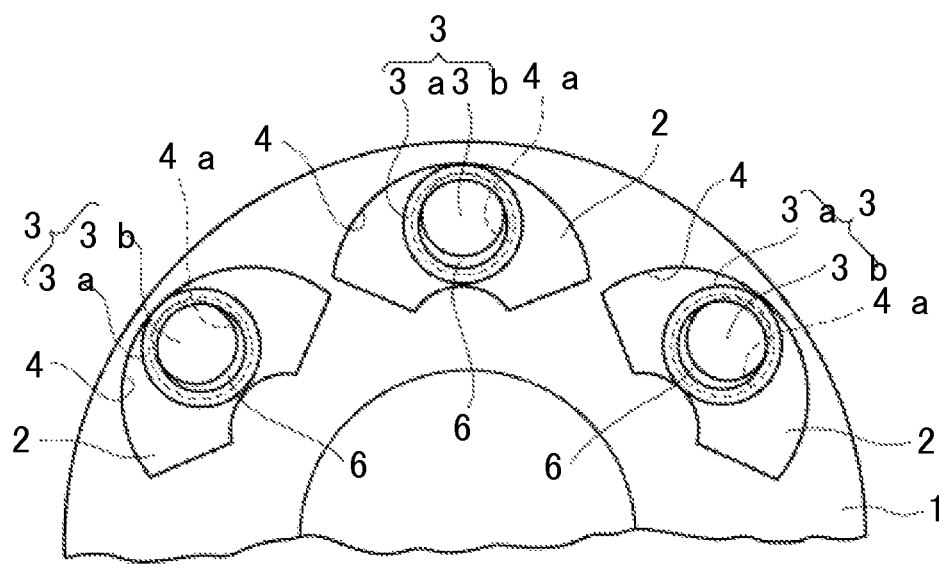
FIG. 7 is a partial front view for illustrating still another example of the torsional vibration damping device according to this invention.
Figure 8:
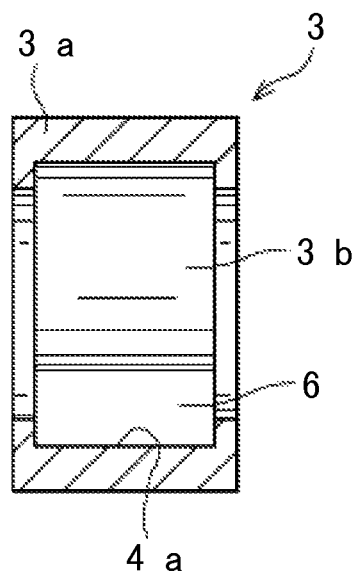
FIG. 8 is an enlarged cross-sectional view of each rolling element shown in FIG. 7.

Besides, as opposed to the example shown in FIG. 5 and FIG. 6, an example shown in FIG. 7 and FIG. 8 is an example that is configured such that the axial length of each of the second rolling elements 3b becomes shorter than the axial length of a corresponding one of the first rolling elements 3a, and that the outer peripheral portion of each of the second rolling elements 3b is rollably engaged with the inner peripheral portion of a corresponding one of the first rolling elements 3a. That is, the second rolling element 3b is formed in the shape of a circular column or a circular plate whose axial length or width is set smaller than the axial length (or the width) of the first rolling element 3a (more precisely, the hollow portion that is formed in the first rolling element 3a). In contrast, a guide groove 6 whose width is larger than the width or axial length of the outer peripheral portion of the second rolling element 3b is formed along the entire circumference, as a configuration equivalent to the guide portion in this invention, at the central portion of the inner peripheral surface of the first rolling element 3a in the axial direction. That is, the second rolling element 3b is configured to be fitted in the guide groove 6 and roll on the inner peripheral side of the first rolling element 3a with a bottom surface of the guide groove 6 serving as the rolling contact surface 4a. Accordingly, in each of the rolling elements 3 configured as shown in FIG. 7 and FIG. 8, in a state where the second rolling element 3b is pressed against the inner peripheral portion of the first rolling element 3a due to a centrifugal force, the outer peripheral portion of the second rolling element 3b is fitted in the guide groove 6 that is formed in the first rolling element 3a, and these rolling elements 3a and 3b are hooked on each other in the axial direction. Therefore, the first rolling element 3a and the second rolling element 3b can be prevented from relatively deviating from each other in the axial direction.

Figure 9:
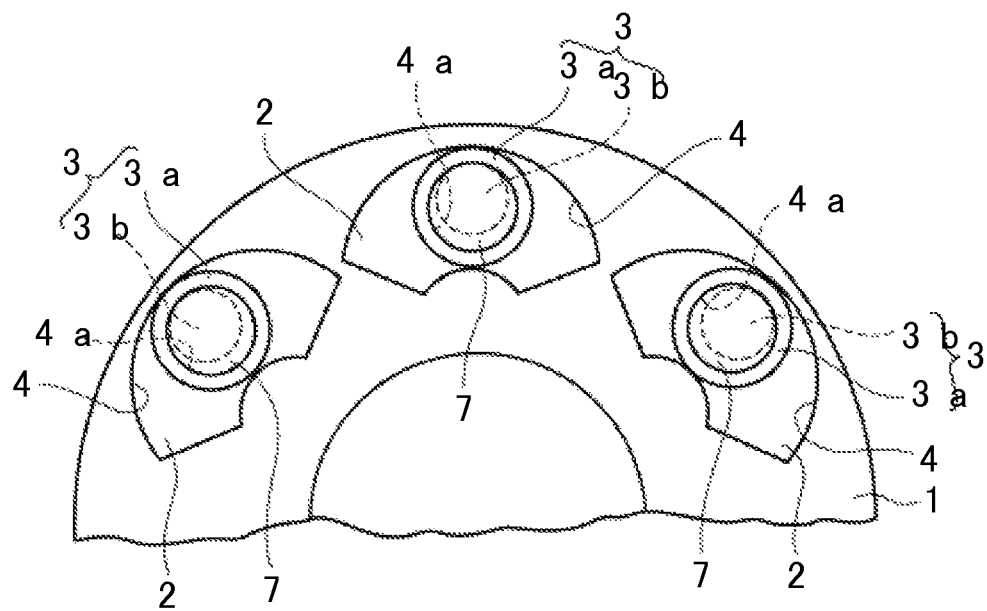
FIG. 9 is a partial front view for illustrating an example in which hollow portions in the torsional vibration damping device according to this invention are closed by covers respectively.
Figure 10:
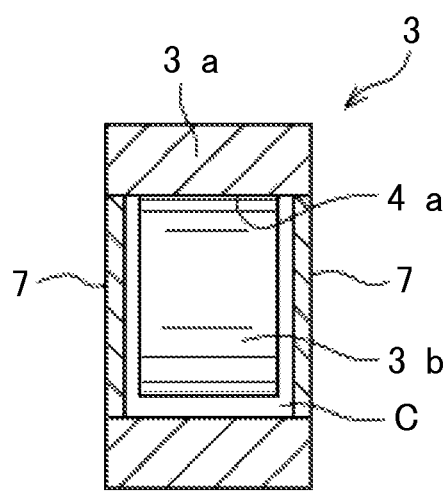
FIG. 10 is an enlarged cross-sectional view of each rolling element shown in FIG. 9.

Furthermore, in this invention, a hollow portion C that is formed in each of the first rolling elements 3a can assume a sealed structure. FIG. 9 and FIG. 10 show that example. Thin circular plate-like covers 7 are fitted in opening portions on both end sides of the hollow portion C respectively. The hollow portion C is closed by these covers 7. Then, the width or axial length of the second rolling element 3b that is accommodated in this hollow portion C is set shorter than the clearance between the covers 7 such that a gap is created between the second rolling element 3b and an inner surface of each of these covers 7. Accordingly, in the configuration shown in FIG. 9 and FIG. 10, the second rolling element 3b is accommodated in the hollow portion C of a sealed structure. Therefore, the second rolling element 3b does not fall out from the hollow portion C, and the first rolling element 3a and the second rolling element 3b are prevented from relatively deviating from each other in the axial direction. Besides, the second rolling element 3b can freely move inside the hollow portion C to a certain extent. Therefore, the second rolling element 3b may come into abutment on the inner surface of the hollow portion C, and as a result, a collision noise may be generated. However, the hollow portion C is sealed by the covers 7, so that the collision noise is restrained from leaking out to the outside. That is, a so-called abnormal noise can be suppressed.

Figure 11:
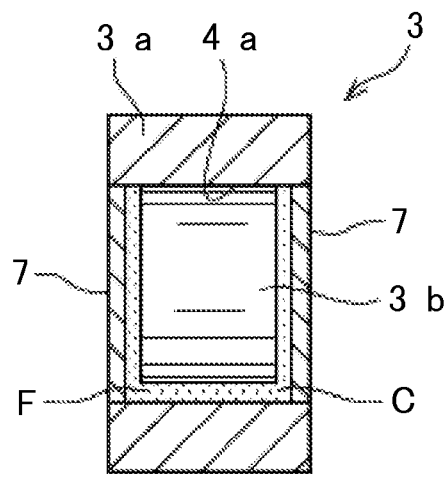
FIG. 11 is a cross-sectional view of a rolling element having a hollow portion that is sealed by a cover and filled with oil.

Incidentally, in the case of a configuration in which the hollow portion C is sealed by the covers 7, the hollow portion C can be configured to be liquid-tightly sealed by the covers 7. In that case, as shown in FIG. 11, the hollow portion C may be filled with an oil F. In such a configuration, the first rolling element 3a and the second rolling element 3b can be prevented from relatively deviating from each other in the axial direction, and an abnormal noise can be suppressed. In addition, the first rolling element 3a and the second rolling element 3b are restrained from coming into contact with each other to be abraded, so that the durability can be enhanced.

Figure 12:
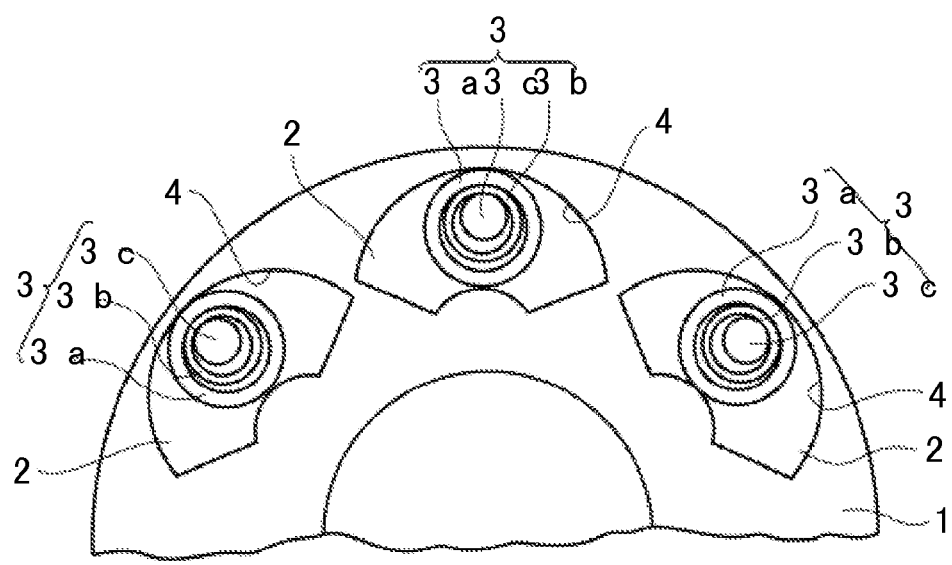
FIG. 12 is a partial front view for illustrating an example in which rolling elements in the torsional vibration damping device according to this invention assume a so-called triple structure.
Figure 13:
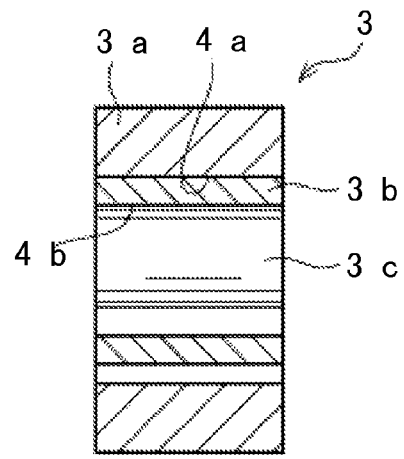
FIG. 13 is an enlarged cross-sectional view of each rolling element shown in FIG. 12.

Each of the concrete examples described above is an example in which the rolling element assumes a so-called double structure. In short, however, the rolling element in this invention is only required to assume a so-called multiple structure, and is not limited to the double structure. For example, as shown in FIG. 12 and FIG. 13, it is also appropriate to adopt a configuration in which each of the cylindrical or ring shaped second rolling elements 3b, whose outer diameter is smaller than the inner diameter of the cylindrical or ring shaped first rolling elements 3a, is accommodated inside a corresponding one of the first rolling elements 3a, and furthermore, each of solid cylinder column-like or shaft-like third rolling elements 3c, whose outer diameter is smaller than the inner diameter of the second rolling elements 3b, is accommodated inside a corresponding one of the second rolling elements 3b, and also, an inner peripheral surface of each of the second rolling elements 3b serves as a corresponding one of third rolling contact surfaces 4b.

Figure 14:
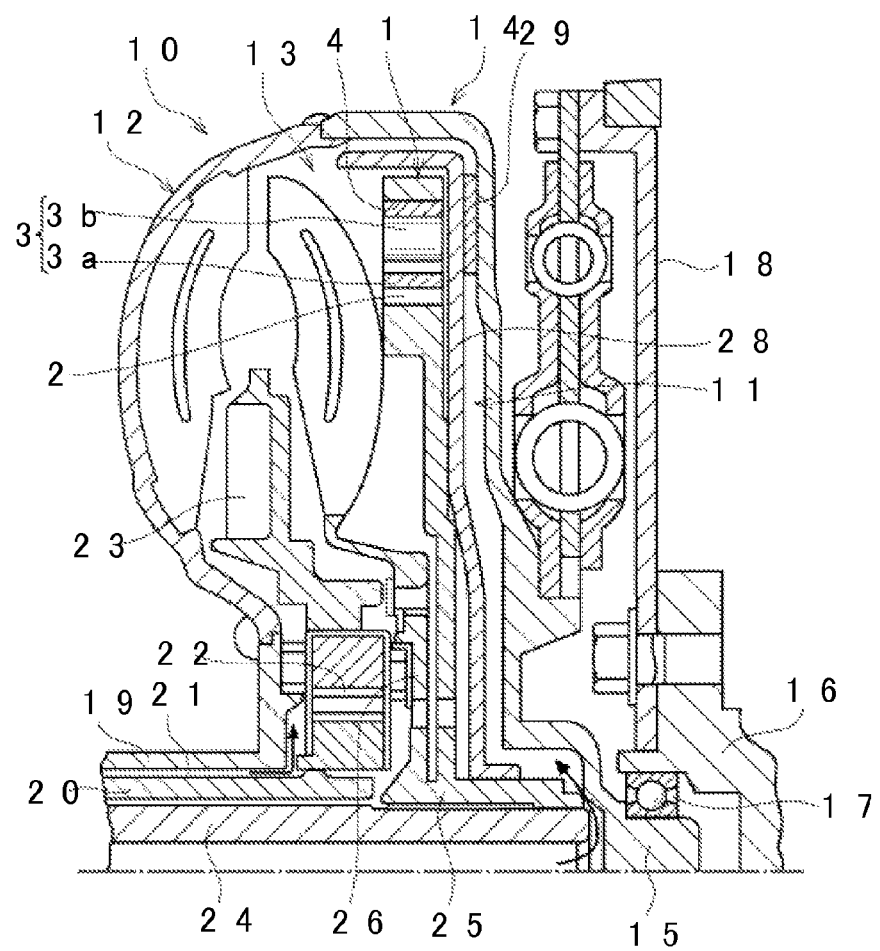
FIG. 14 is a schematic cross-sectional view showing an example in which the torsional vibration damping device according to this invention is integrated in a torque converter.

By the way, the torsional vibration damping device according to this invention can be employed for various rotary members that are subjected to torsional vibrations, and can damp or reduce the torsional vibrations. As an example, FIG. 14 shows an example in which the torsional vibration damping device is integrated in a fluid coupling. The example shown herein is an example in which the rotating body 1 and the rolling elements 3 configured as shown in FIG. 1 are integrated in a torque converter 10. The torque converter 10 is equipped with a configuration similar to that of a torque converter equipped with a lockup clutch 11, which is conventionally mounted on a wide variety of vehicles. That is, a pump impeller 12 as an input-side member is configured by attaching annularly arranged pump blades to an inner surface of a pump shell, and a turbine runner 13 is arranged opposed to the pump impeller 12. This turbine runner 13 has a shape substantially symmetric to the pump impeller 12, and is configured by fixing a multitude of annularly arranged turbine blades to an inner surface of an annular (or semi-doughnut-like) shell. Accordingly, this pump impeller 12 and this turbine runner 13 are arranged opposed to each other on the same axis.

A front cover 14 that covers an outer peripheral side of the turbine runner 13 is integrally joined to an outer peripheral end of the pump shell. As shown in FIG. 14, this front cover 14 is a so-called bottomed cylindrical member that has a front wall portion that is opposed to the inner surface of the pump shell. A shaft portion 15 is protrusively formed at a central portion of an outer surface of the front wall portion. The shaft portion 15 is inserted in a tip portion of a crankshaft 16 of an engine (not shown), and is relatively rotatably coupled to the crankshaft 16 via a bearing 17. Besides, a drive plate 18 is attached to the crankshaft 16, and the drive plate 18 and the front cover 14 are coupled to each other via a damper.

Besides, a cylindrical shaft 19 is integrally provided at an inner peripheral end of the pump shell. The cylindrical shaft 19 extends to a back surface side of the pump shell (the other side of the engine side), and is coupled to an oil pump (not shown). A stationary shaft 20 whose outer diameter is smaller than an inner diameter of the cylindrical shaft 19 is inserted inside the cylindrical shaft 19. A tip portion of the stationary shaft 20 extends to an interior of the torque converter 10, which is surrounded by the pump shell 4 and the front cover 14. This stationary shaft 20 is a hollow shaft-like region that is formed integrally with a stationary wall portion (not shown) that retains an oil pump. A space between an outer peripheral surface of this stationary shaft 20 and an inner peripheral surface of the cylindrical shaft 19 serves as a fluid flow passage (i.e., an oil passage) 21.

The tip portion of the stationary shaft 20 is located on an inner peripheral side of the foregoing turbine runner 13 or on an inner peripheral side of a region between the pump impeller 12 and the turbine runner 13. An inner race of a one-way clutch 22 is spline-fitted to the tip portion of this stationary shaft 20. Besides, a stator 23 that is arranged between an inner peripheral portion of the foregoing pump impeller 12 and an inner peripheral portion of the turbine runner 13 that is opposed thereto is attached to an outer race of the one-way clutch 22.

An output shaft (an input shaft of a transmission (not shown)) 24 is rotatably inserted on the inner peripheral side of the aforementioned stationary shaft 20. A tip portion of the output shaft 24 protrudes from (traverses) the tip portion of the stationary shaft 20, and extends to the vicinity of an inner surface of the front cover 14. A hub shaft 25 is spline-fitted to a tip outer peripheral portion that protrudes from the stationary shaft 20. This hub shaft 25 is provided with a flange-like hub 26 that protrudes toward an outer peripheral side. The foregoing turbine runner 13 is coupled to the hub 26 in such a manner as to be integrated with the hub 26. Then, the foregoing rotating body 1 is integrated with the hub shaft 25.

A lockup clutch (a direct-coupled clutch) 11 is provided opposed to the inner surface of the front cover 14. As is the case with those conventionally known, this lockup clutch 11 is designed to couple a driving-side member and a driven-side member to each other through the use of mechanical means in a manner that enables torque transmission. In the example shown in FIG. 14, the hub shaft 25 and the front cover 14 are configured to be coupled to each other. That is, the lockup clutch 11 is mainly constituted of a circular disc-like lockup piston 28 that is arranged between the aforementioned torsional vibration damping device and the inner surface of the front cover 14. The lockup piston 28 is spline-fitted to the foregoing hub shaft 25. Besides, a friction material 29 that is pressed against the front cover 14 to generate a frictional force is attached to a location on an outermost peripheral side of a lateral surface of the lockup piston 28 that is opposed to the front cover 14. Furthermore, the outer diameter of the lockup piston 28 is slightly smaller than the inner diameter of the front cover 14. A cylindrical portion that extends in the axial direction along the inner peripheral surface of the front cover 14 is formed at an outer peripheral end of the lockup piston 28. Accordingly, the lockup piston 28 is configured to be pressed rightward in FIG. 14 and engaged through contact of the friction material 29 with the front cover 14 so as to transmit a torque between the front cover 14 and the hub shaft 25, and to be pressed back leftward in FIG. 14 and released through detachment of the friction material 29 from the front cover 14 so as to shut off the transmission of the torque.

Then, the interior of a casing that is constituted of the aforementioned front cover 14 and the pump shell integrated therewith is filled with oil (automatic transmission fluid: ATF). Accordingly, the first rolling elements 3a and the second rolling elements 3b assume a state of being immersed in the oil. The rotating body 1 that retains these rolling elements 3a and 3b is integrated with the hub shaft 25 to which the lockup piston 28 is spline-fitted. Therefore, when the lockup clutch 11 is engaged, a torque output by the engine is transmitted to the rotating body 1 via the front cover 14 and the lockup clutch 11 engaged therewith. Accordingly, in the case where the rotating body 1 is subjected to torsional vibrations due to periodical fluctuations of the output torque of the engine, the rolling elements 3 make pendular movements as described above, and vibrations of a predetermined order are damped or reduced. In that case, the rolling elements 3 that are constituted of the first rolling elements 3a and the second rolling elements 3b respectively assume a state of being immersed in oil. Therefore, the contact portions between the first rolling elements 3a and the rolling contact surfaces 4, and the contact portions between the first rolling elements 3a and the second rolling elements 3b are lubricated by oil. Besides, an impact that is caused when those first rolling elements 3a and those rolling contact surfaces 4 come into abutment on each other respectively and the first rolling elements 3a and the second rolling elements 3b come into abutment on each other respectively can be mitigated. Therefore, the durability of the device as a whole can be enhanced.

The invention claimed is:

1. A torsional vibration damping device comprising:
   a rotating body that rotates upon receiving a torque, wherein a first rolling contact surface that is curved with a center of curvature at a location offset from a rotation center of the rotating body is formed along a circumferential direction of the rotating body at a location offset from the rotation center of the rotating body in a radial direction; and
   a rolling element that is brought into contact with the first rolling contact surface by receiving a centrifugal force resulting from rotation with the rotating body and that rolls along the first rolling contact surface through torsional vibrations of the rotating body, wherein
   the rolling element includes a first rolling element that rolls along the first rolling contact surface and that is formed in a hollow shape, and a second rolling element that is arranged inside the first rolling element such that the second rolling element rolls along a second rolling contact surface formed inside the first rolling element.

2. The torsional vibration damping device according to claim 1, wherein the rolling element is configured to be immersed in oil and roll in the oil.

3. The torsional vibration damping device according to claim 1, further comprising a fluid coupling in which a pump impeller and a turbine runner, which transmit a torque via oil, are accommodated inside a casing, wherein:
   the rotating body and the rolling element are accommodated inside the casing; and
   the rolling element is configured to roll in the oil.

4. The torsional vibration damping device according to claim 1, wherein:
   the first rolling element is formed in a cylindrical shape; and
   the second rolling element is formed in a shape of a solid circular column with an outer diameter that is smaller than an inner diameter of the first rolling element.

5. The torsional vibration damping device according to claim 4, wherein a guide portion that restrains the first rolling element and the second rolling element from relatively deviating from each other in an axial direction is provided on at least one of an inner peripheral portion of the first rolling element and an outer peripheral portion of the second rolling element.

6. The torsional vibration damping device according to claim 5, wherein:
   the first rolling element and the second rolling element are formed such that an axial length of the second rolling element becomes longer than an axial length of the first rolling element; and
   the guide portion is constituted by flange portions that are formed at both ends of the second rolling element in the axial direction and that protrude outward in the radial direction so as to sandwich the first rolling element.

7. The torsional vibration damping device according to claim 5, wherein:
   the first rolling element and the second rolling element are formed such that an axial length of the first rolling element becomes longer than an axial length of the second rolling element; and
   the guide portion is constituted by a groove portion that is formed at a central portion of an inner peripheral surface of the first rolling element in the axial direction such that the second rolling element is rollably fitted therein.

8. The torsional vibration damping device according to claim 1, wherein a hollow portion that is formed inside the first rolling element is closed by a cover member such that the second rolling element, which is arranged inside the hollow portion, does not fall out.

9. The torsional vibration damping device according to claim 8, wherein:
- the cover member seals the hollow portion in a liquid-tight state; and
- the hollow portion is filled with oil.

10. The torsional vibration damping device according to claim 1, wherein:
- the second rolling element is formed in a hollow shape and rolls along the second rolling contact surface;
- a third rolling contact surface is formed on an inner peripheral surface of the second rolling element; and
- a third rolling element that rolls along the third rolling contact surface is accommodated inside the second rolling element.

* * * * *